UNITED STATES PATENT OFFICE 2,312,697

REACTION PRODUCT OF ALDEHYDES AND SULPHAMYLARYLAMINO TRIAZINES

Gaetano F. D'Alelio, Pittsfield, Mass., assignor to General Electric Company, a corporation of New York No Drawing. Application November 28, 1941, Serial No. 420,860

20 Claims. (Cl. 260—42)

This invention relates to the production of new synthetic materials and more particularly to new reaction products of especial value in the plastics and coating arts. Specifically the invention is concerned with compositions of matter comprising a condensation product of ingredients comprising an aldehyde, including polymeric aldehydes and aldehyde-addition products, e. g. formaldehyde, paraformaldehyde, dimethylol urea, trimethylol melamine, etc., and an organic compound corresponding to the following general formula:

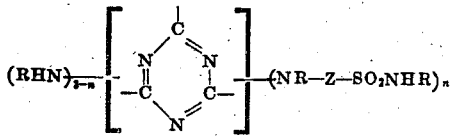

In the above formula (Formula I) $n$ represents in integer and is at least 1 and not more than 3, Z represents an aryl nucleus, and R represents a member of the class consisting of hydrogen and monovalent hydrocarbon and substituted hydrocarbon radicals, more particularly halo-hydrocarbon radicals. From a consideration of the formula it will be seen that when $n$ is three there will be no amino (—NHR) groups attached to the triazine nucleus. Instead of the sulphamylarylamino symmetrical triazines (s-triazines) represented by the above formula, corresponding derivatives of the asymmetrical and vicinal triazines may be used.

Illustrative examples of monovalent radicals that R in the above formula may represent are: aliphatic (e. g., methyl, ethyl, propyl, isopropyl, allyl, butyl, isobutyl, secondary butyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, allylphenyl, 2-butenylphenyl, propylphenyl, isopropylphenyl, etc.); aryl-substituted aliphatic (e. g., benzyl, phenylethyl, phenylpropyl, cinnamyl, etc.); and their homologues, as well as those groups with one or more of their hydrogen atoms substituted by, for example, a halogen. Specific examples of halohydrocarbon radicals are chlorophenyl, chlorocyclohexyl, chloroethyl, dichlorophenyl, ethylchlorophenyl, phenylchloropropyl, bromobutyl, bromotolyl, etc. Preferably R is hydrogen.

Illustrative examples of aryl nuclei that Z in the above formula may represent are: benzene; aliphatic-substituted benzenes, e. g., the ortho- meta- and paratoluenes, the xylenes, the ethylbenzenes, the propylbenzenes, etc.; the aromatic-substituted benzenes, e. g., phenylbenzene, etc.; naphthalene; the aliphatic-substituted naphthalenes, e. g., the mono-, di-, and tri-methyl naphthalenes, the mono-, di- and tri-ethyl naphthalenes, the mono-, di- and tri-propyl naphthalenes, etc.; the aromatic-substituted naphthalenes, e. g., the phenyl naphthalenes, etc.; and others, including halogenated (e. g., chlorinated, brominated, etc.) aryl nuclei.

More specific examples of sulphamylarylamino triazines that may be employed in producing my new condensation products are the tri-(sulphamylamino) s-triazines, the monoamino (—NHR) di-(sulphamylarylamino) s-triazines and the diamino [(—NHR)₂] mono-(sulphamylarylamino) s-triazines. The sulphamylarylamino triazines that are used in carrying the present invention into effect are more fully described and claimed in my copending application Serial No. 420,861, filed Nov. 28, 1941, and assigned to the same assignee as the present invention. As pointed out in this copending application, a suitable method for preparing the sulphamylarylamino triazines comprises effecting reaction between a triamino [(—NHR)₃] triazine and an aminoarylsulphonamide. This reaction may be represented by the following general equation:

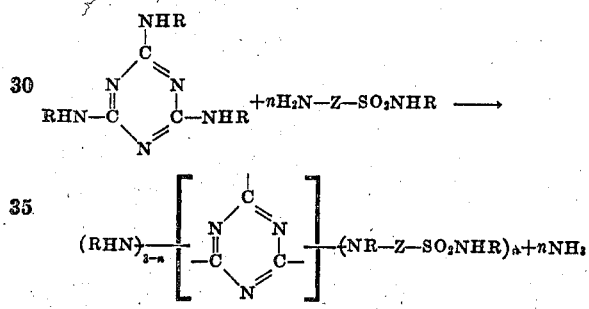

In the above equation $n$, Z and R have the same meanings as given above with reference to Formula I. This reaction preferably is carried out in an inert organic solvent having a boiling point above 150° C., for example ethylene glycol.

Other and more specific examples of sulphamylarylamino triazines that may be used in practicing my invention are listed below:

Ortho-sulphamylanilino diamino s-triazine
Meta-sulphamylanilino diamino s-triazine
Para-sulphamylanilino diamino s-triazine
Para-sulphamyltoluido diamino s-triazine
2 - (meta-sulphamyltoluido)4,6-di-(ethylamino) s-triazine
Di-(ortho-sulphamylanilino) amino s-triazine
Di-(meta-sulphamylanilino) amino s-triazine
Di-(para-sulphamylanilino) amino s-triazine
Di-(para-sulphamyltoluido) amino s-triazine
2,4,6-tri-(ortho-sulphamylanilino) s-triazine
2,4,6-tri-(meta-sulphamylanilino) s-triazine
2,4,6-tri-para-sulphamylanilino) s-triazine 2,4,6-tri-(para-sulphamyltoluido) s-triazine
2,4,6-tri-(meta-sulphamylxylidino) s-triazine
2 - (para - sulphamyltoluido) 4,6-di-(methylamino) s-triazine
2 - [para - (phenylsulphamyl)-xylidino]4,6-di-(anilino) s-triazine
2 - [para - (methylsulphamyl)-benzylamino]4-methylamino 6-amino s-triazine
2 - [para - (benzylsulphamyl)-chloroanilino]4-toluido 6-benzylamino s-triazine
2 - [para - (tolylsulphamyl) - ethylanilino]4-chloroanilino 6-amino s-triazine
2 - (4' - sulphamylnaphthyl - 1'-amino)4,6-diamino s-triazine
2 - [para-sulphamylphenyl-(methyl)-amino]4,6-di-amino s-triazine
2-(ortho-sulphamylanilino)4-(3'-butenylamino) 6-chlorobutylamino s-triazine
2 - [meta - sulphamyltolyl-(phenyl)-amino]4-(ethyl-chloroanilino) 6-(chlorobutyl-anilino) s-triazine
2,4-di-(ortho-sulphamylanilino) 6-methylamino s-triazine
2,4 - di-(meta-sulphamylanilino) 6-anilino s-triazine
2,4 - di-(para-sulphamyltoluido) 6-benzylamino s-triazine
2,4-di-(para-sulphamylxylidino) 6-chloroanilino s-triazine
2-(para-sulphamylanilino) 4-(ortho-sulphamylanilino) 6-amino s-triazine
2 - (para-sulfamylanilino) 4 - (para - sulfamyltoluido) 6-methylamino s-triazine
2-(ortho-sulphamylanilino) 4-(meta-sulphamylanilino) 6-(para-sulphamylanilino) s-triazine
2 - (para-sulphamylanilino) 4,6-di-(cyclohexylamino) s-triazine
2 - (meta - sulphamylanilino) 4,6 - di - (chlorophenylamino) s-triazine
2-(para-sulphamylanilino) 4,6-di-(chloronaphthylamino) s-triazine The present invention is based on my discovery that new and valuable materials of particular utility in the plastics and coating arts can be produced by effecting reaction at normal or at elevated temperatures between ingredients comprising essentially an aldehyde, including polymeric aldehydes and aldehyde-addition products, and triazines (more particularly the symmetrical triazines) containing at least one sulphamylarylamino (—NR—aryl—SO₂NHR) substituent attached directly to a carbon atom of the triazine nucleus.

Resins heretofore have been made by condensing an aldehyde with an aminotriazine, e. g., melamine. The suggestion also has been made that resinous materials be prepared by condensing an aliphatic aldehyde containing a chain of at the most six carbon atoms with compounds of the general formula

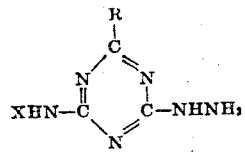

wherein X stands for a member of the group consisting of hydrogen and NH₂, and R represents a member of the class consisting of hydrazino, phenyl, hydroxy, alkoxy and thioether groups and halogen atoms. Such resins have excellent heat and water resistance, but are deficient in other properties that are desirable in a resin to be used in the production of molding compositions and molded articles. The arylsulphonamide-aldehyde resins, on the other hand, have much better flow characteristics than the aminotriazine-aldehyde resins, specifically melamine-formaldehyde resins, but are less resistant to water. The resinous condensation products of the present invention have a high water resistance approximating that of the known aminotriazine-aldehyde resins plus the improved flow characteristics of the arylsulphonamide-aldehyde resins. The heat resistance and curing characteristics of my new resins also are much better than those of the arylsulphonamide-aldehyde resins.

Thus it is seen that the present invention provides a resinous composition which has combined therein the desirable properties of the conventional aminotriazine-aldehyde and arylsulphonamide-aldehyde resins without sacrifice of other useful properties. This is a surprising and unexpected result that in no way could have been predicted. Because of the unique properties of the resins of this invention, they are suitable for molding and other applications for which the ordinary aminotriazine-aldehyde and arylsulphonamide-aldehyde resins, as well as other resins of the aminoplast type, e. g., urea-aldehyde resins, are unsuited.

In carrying my invention into effect the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde - non-reactable nitrogen - containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulphate, monosodium phosphate, monosodium phthalate, etc. Mixtures of acids, of acid salts or of acids and of acid salts may be employed if desired.

The reaction between the aldehyde, e. g., formaldehyde, and the sulphamylarylamino triazine may be carried out in the presence or absence of solvents or diluents, fillers, other natural or synthetic resinous bodies, or while admixed with other materials that also can react with the aldehydic reactant or with the sulphamylarylamino triazine, e. g., ketones, urea (NH₂CONH₂), thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the sulphamylarylamino triazines, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like.

The modifying reactants may be incorporated with the sulphamylarylamino triazine and the aldehyde by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising (1) urea or melamine or urea and melamine, (2) a sulphamylarylamino triazine (including both mono- and polysulphamylarylamino triazines), e. g., para-sulphamylanilino diamino s-triazine, and (3) an aldehyde, including polymeric aldehydes and aldehyde-addition products, for instance formaldehyde, paraformaldehyde, dimethylol urea, a polymethylol melamine, e. g., hexamethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have a glossy surface finish and show excellent resistance to water and arcing. By suitable choice of the starting reactants and the conditions of reaction resinous materials are produced that, when made into molding compositions and molded, yield light-colored, light-resistant molded articles.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, e. g., alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled, heat-convertible resins.

In order that those skilled in the art better may understand how this invention may be carried into effect, the following examples are given by way of illustration. All parts are by weight.

*Example 1*

| | Parts |
|---|---|
| Para-sulphamylanilino diamino s-triazine | 56.2 |
| Aqueous formaldehyde (approx. 37.1% HCHO) | 48.6 |
| Aqueous ammonia (approx. 28% NH₃) | 5.0 |
| Sodium hydroxide in a small amount of water | 0.08 |
| Water | 20.0 | were heated together under reflux at the boiling temperature of the mass for 15 minutes, yielding a clear resinous syrup. This syrup was potentially heat-curable as shown by the fact that when treated with various curing agents, followed by heating on a 140° C. hotplate, it cured rapidly to an insoluble, infusible state.

The syrup produced as described above was dehydrated by heating it at 60° to 70° C. after which a small amount of a curing agent, specifically chloroacetamide (monochloroacetamide), was incorporated into the dehydrated resin. A sample of the resulting product was molded at 130° C. under a pressure of 2,000 pounds per square inch. The molded piece was well cured, strong and nearly transparent.

Instead of producing the resinous syrup as above described by heating the mixed components under reflux at boiling temperature, the reaction between the para-sulphamylanilino diamino s-triazine and the formaldehyde may be effected at room temperature (20° to 30° C.), using a reaction period of, for instance, several days or longer.

Instead of incorporating the chloroacetamide into the dehydrated resin as mentioned above, the chloroacetamide may be added to the resinous syrup and the resulting mixture heated under reflux for a short period of time to cause the chloroacetamide to intercondense with the partial condensation product of the para-sulphamylanilino diamino s-triazine and formaldehye.

Instead of using chloroacetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.) or by intercondensation with curing reactants other than monochloroacetamide (e. g., di- and tri-chloroacetamides, chloroacetonitriles, alpha, beta-dibromopropionitrile, aminoacetamide, hydrochloride, aminoacetonitrile hydrochloride, ethylene diamine monohydrochloride, diethanolamine hydrochloride, nitrourea, chloroacetyl urea, chloroacetone, glycine, sulphamic acid, citric diamide, phenacyl chloride, etc. Other examples of active and latent curing catalysts and of curing reactants that may be employed to accelerate or to effect the curing of the thermosetting or potentially thermosetting resins of this and other examples are given in various copending applications of mine, for instance in copending applications Serial No. 346,962, filed July 23, 1940, and Serial No. 354,395, filed August 27, 1940, both of which applications are assigned to the same assignee as the present invention.

*Example 2*

| | Parts |
|---|---|
| Para-sulphamylanilino diamino s-triazine | 28.1 |
| Urea | 54.0 |
| Aqueous formaldehyde (approx. 37.1% HCHO) | 162.0 |
| Aqueous ammonia (approx. 28% NH₃) | 4.0 |
| Sodium hydroxide in a small amount of water | 0.1 | were heated together under reflux at boiling temperature for 30 minutes, yielding a water-white syrup. The addition of a curing agent such as mentioned under Example 1 to a small sample of this syrup, followed by heating on a 140° C. hotplate, caused the syrup to cure rapidly to an insoluble, infusible state.

One (1) part chloroacetamide was added to the syrup produced as above described and the mixture then was heated under reflux for an additional 10 minutes. A molding (moldable) composition was made from the resulting syrup by mixing therewith 70 parts alpha cellulose in flock form and 0.4 part of a mold lubricant, specifically zinc stearate. The wet molding compound was dried for 2 hours at 60° C. A well-cured molded piece was produced by molding a sample of the dried and ground molding compound at 130° C. for 5 minutes under a pressure of 2,000 pounds per square inch. The molding compound showed excellent flow characteristics during molding.

*Example 3*

| | Parts |
|---|---|
| Phenol, synthetic | 45.0 |
| Aqueous formaldehyde (approx. 37.1% HCHO) | 97.5 |
| Potassium carbonate in 10 parts water | 1.43 |
| Para-sulphamylanilino diamino s-triazine | 4.5 |

A phenol-formaldehyde partial condensation product was produced by heating the above-stated amounts of phenol and formaldehyde together in the presence of the stated amount of potassium carbonate at 65° to 70° C. for 3½ hours in a reaction vessel provided with a reflux condenser. The parasulphamylanilino diamino s-triazine was added to the syrupy phenol-formaldehyde partial condensation product and the resulting mixture was heated under reflux for 1 hour. The resulting syrup was acidified by the addition of 1.5 parts oxalic acid dissolved in 10 parts water. A molding compound was made from this acidified syrup by mixing therewith 28.5 parts alpha cellulose and 0.3 part zinc stearate. The wet molding compound was dried for 3 hours at 60° C. A sample of the dried and ground molding compound was molded for 5 minutes at 130° C. under a pressure of 2,000 pounds per square inch. The molded piece was light colored and was well cured throughout. The molding composition showed excellent flow characteristics during molding.

*Example 4*

| | Parts |
|---|---|
| Para-sulphamylanilino diamino s-triazine | 28.1 |
| Furfural | 28.8 |
| Sodium hydroxide in a small amount of water | 0.1 |
| Water | 100.0 | were heated together under reflux at boiling temperature for 15 minutes, yielding a very viscous resinous material. When a sample of this resin was heated on a 140° C. hotplate, it converted slowly to an insoluble and infusible state. The addition of chloroacetamide and other curing agents such as mentioned under Example 1 to the viscous resin increased the rapidity of cure of the resin. The resinous composition of this example may be used either in the production of molding compounds or in the manufacture of liquid coating compositions.

*Example 5*

| | Parts |
|---|---|
| Para-sulphamylanilino diamino s-triazine | 28.1 |
| Acrolein | 16.8 |
| Sodium hydroxide in a small amount of water | 0.1 |
| Water | 10.0 | were heated together under reflux at boiling temperature for 15 minutes. This resin cured slowly to an infusible state when a sample of it was heated on a 140° C. hotplate. The addition of curing agents such as mentioned under Example 1, e. g., sulphamic acid, glycine, nitrourea, etc., accelerated the cure of the resin to the insoluble and infusible state. The resinous material of this example may be used in the production of molding compositions and as a modifier of other resinous materials.

*Example 6*

| | Parts |
|---|---|
| Para-sulphamylanilino diamino s-triazine | 28.1 |
| Butyl alcohol | 74.0 |
| Aqueous formaldehyde (approx. 37.1% HCHO) | 32.4 |
| Sodium hydroxide in a small amount of water | 0.1 | were heated together under reflux at the boiling temperature of the mass for 30 minutes, yielding a clear, colorless syrup. This syrup was potentially heat-curable as evidenced by the fact that when citric acid, chloroacetamide and other curing agents such as mentioned under Example 1 were incorporated either into the syrup or into the dehydrated resin, followed by heating on a 140° C. hotplate, an insoluble and infusible resin was obtained. When a sample of the syrupy condensation product was applied to a glass plate and the coated plate then was baked at 60° to 70° C., a hard, transparent film was formed on the plate. The resinous material of this example is particularly suitable for use in the preparation of liquid coating compositions.

Example 7

| | Parts |
|---|---|
| Para-sulphamylanilino diamino s-triazine | 28.1 |
| Acetamide | 5.9 |
| Aqueous formaldehyde (approx. 37.1% HCHO) | 32.4 |
| Sodium hydroxide in a small amount of water | 0.1 | were heated together under reflux at boiling temperature for 15 minutes. The resulting syrup was clear and colorless and, upon dehydration at 140° C., gave a transparent, thermoplastic resin. When curing agents such as mentioned under Example 1 were added to the syrup or to the thermoplastic resin, followed by heating at 140° C., the resinous material was converted to a cured or insoluble and infusible state. The thermoplastic resin is soluble in alcohols and other organic solvents. The resinous material of this example may be used in the production of coating materials or as a modifier of other synthetic resins.

Example 8

| | Parts |
|---|---|
| Para-sulphamylanilino diamino s-triazine | 28.1 |
| Diethyl malonate | 16.0 |
| Aqueous formaldehyde (approx. 37.1% HCHO) | 48.6 |
| Sodium hydroxide in a small amount of water | 0.1 |

The above components were heated together under reflux at boiling temperature for 15 minutes. When various curing agents such as mentioned under Example 1 were added to small samples of the syrupy condensation product, and the resulting mixtures then were heated on a 140° C. hotplate, in all cases the liquid resinous material was converted rapidly to a cured resin. The resinous composition of this example also cures slowly to an insoluble and infusible state in the absence of a curing agent.

Example 9

| | Parts |
|---|---|
| Para-sulphamylanilino diamino s-triazine | 28.1 |
| Aqueous formaldehyde (approx. 37.1% HCHO) | 32.4 |
| Glycerine | 9.2 |
| Sodium hydroxide in a small amount of water | 0.1 | were heated together under reflux at boiling temperature for 30 minutes, yielding a water-white syrup. When a sample of this syrup was heated at 140° C. it bodied to a clear, thermoplastic resin. The addition of curing agents such as mentioned under Example 1 either to the syrup or to the thermoplastic resin, followed by heating on a 140° C. hotplate, caused the material to cure to an insoluble and infusible state. The resinous material had an extended flow during curing, which indicates that the resin would be suitable for use as a plasticizer of less plastic resins to improve their plasticity or flow characteristics.

Example 10

| | Parts |
|---|---|
| Para-sulphamylanilino diamino s-triazine | 28.1 |
| Polyvinyl alcohol | 26.4 |
| Aqueous formaldehyde (approx. 37.1% HCHO) | 64.8 |
| Sodium hydroxide in a small amount of water | 0.1 |
| Water | 100.0 | were heated together under reflux at boiling temperature for 30 minutes. The resulting product was a clear, colorless, thick syrup that tended to gel on cooling. When a sample of the resinous condensation product was heated on a 140° C. hotplate, a transparent, thermoplastic film was produced. Another sample of the syrup was treated with a small amount of hydrochloric acid. The pH of the syrup after the addition of the hydrochloric acid was 4.0. A tough, infusible resin was produced when the acidified syrup was heated on a 140° C. hotplate. The cured resin had a much better resistance to water than the resin resulting from similarly heating the syrup in the absence of the hydrochloric acid. Instead of hydrochloric acid, other curing agents such as mentioned under Example 1 may be employed to improve the curing characteristics and the water-resistance of the resinous material of this example.

Glass plates were coated with samples of the syrupy condensation product (with and without a curing agent, specifically hydrochloric acid) and the coated plates then were baked for several hours at 70° to 80° C. The baked films were transparent and adhered tenaciously to the glass surface. The films resulting from the resin syrup containing the hydrochloric acid were harder and more resistant to water than those similarly obtained from the resin syrup to which no hydrochloric acid had been added.

The aldehydes mentioned in the above illustrative examples may be replaced in whole or in part by an equivalent amount of an aldehyde-addition product, for example a methylol urea, specifically monomethylol urea or dimethylol urea, a methylol aminotriazine (e. g., a monomethylol aminotriazine such as monomethylol melamine or a polymethylol aminotriazine, specifically a polymethylol melamine such as di-, tri-, tetra-, penta- or hexa-methylol melamines), a methylol diazine, e. g., trimethylol pyrimidine, a methylol guanazole, e. g., dimethylol guanazole, etc.

It will be understood, of course, by those skilled in the art that my invention is not limited to condensation products obtained by reaction of ingredients comprising an aldehyde and the specific sulphamylarylamino triazine mentioned in the above illustrative examples. Thus, instead of parasulphamylanilino diamino s-triazine mentioned in the above examples, any other triazine derivative of the kind with which this invention is concerned may be employed, including the tri-(sulphamylarylamino) s-triazines (e. g., the trisulphamylanilino s-triazines, etc.), the monoamino (—NHR) di-(sulphamylarylamino) s-triazines, specifically the di-(sulphamylanilino) monoamino s-triazines, and the diamino [(—NHR)₂] mono-(sulphamylarylamino) s-triazines, e. g., the diamino mono-(sulphamylanilino) s-triazines. Other and more specific examples were mentioned hereinbefore and in my copending application Serial No. 420,861 by way of illustration.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, valeraldehyde, caproaldehyde, crotonaldehyde, methacrolein, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, substituted ureas, selenoureas, thioureas and iminoureas (numerous examples of which are given in my copending application Serial No. 377,524), mono- and poly- (N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminodiazines, etc. Particularly good results are obtained with active methylene-containing bodies such as the methylol ureas and the methylol melamines, specific examples of which have been given hereinbefore. Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the sulphamylarylamino triazine may be varied over a wide range, but these reactants ordinarily are employed in an amount corresponding to at least one mol of the aldehyde, specifically formaldehyde, for each mol of sulphamylarylamino triazine. Thus, I may use, for example, from one to eight or ten mols of an aldehyde for each mol of sulphamylarylamino triazine. When the aldehyde is available for reaction in the form of an alkylol derivative, more particularly a methylol derivative such, for instance, as dimethylol urea, hexamethylol melamine, etc., then higher amounts of such aldehyde-addition products are used, for instance, from two or three up to fifteen or twenty or more mols of such alkylol derivative for each mol of the sulphamylarylamino triazine.

As indicated hereinbefore and as further shown by a number of the examples, the properties of the fundamental resins of this invention may be varied widely by introducing other modifying bodies before, during or after effecting condensation at normal or at elevated temperatures between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my copending applications Serial No. 289,273, filed August 9, 1939, now Patent No. 2,281,559, issued May 5, 1942, and Serial No. 400,649, filed July 1, 1941, now Patent No. 2,294,873, issued Sept. 1, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a sulphamylarylamino triazine and an aldehyde, I may cause an aldehyde to condense with a salt (organic or inorganic) of the sulphamylarylamino triazine or with a mixture of the triazine derivative and a salt thereof. Examples of organic and inorganic acids that may be used in the preparation of such salts are hydrochloric, sulphuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and under pressures of the order of 1,000 to 5,000 pounds or more per square inch.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

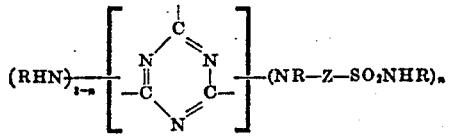

where $n$ represents an integer and is at least 1 and not more than 3, Z represents an aryl nucleus, and R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is the product obtained by effecting initial reaction between the specified components under alkaline conditions.

4. A composition comprising the resinous reaction product of a mixture containing an aldehyde and a sulphamylarylamino s-triazine.

5. A heat-curable resinous composition comprising a heat-convertible condensation product of ingredients comprising formaldehyde and a sulphamylanilino s-triazine.

6. A product comprising the heat-cured resinous composition of claim 5.

7. A resinous composition comprising the product of reaction of ingredients comprising an aldehyde and a di-(sulphamylanilino) monoamino s-triazine.

8. A composition comprising the resinous product of reaction of ingredients comprising formaldehyde and di-(meta-sulphamylanilino) monoamino s-triazine.

9. A composition comprising the resinous product of reaction of a mixture containing a sulphamylanilino diamino s-triazine and an aldehyde.

10. A resinous composition comprising the product of reaction of ingredients comprising an aldehyde and para-sulphamylanilino diamino s-triazine.

11. A composition comprising the resinous material obtained by reaction of a mixture containing formaldehyde and para-sulphamylanilino diamino s-triazine.

12. A composition comprising the product of reaction of ingredients comprising a urea, an aldehyde and a compound corresponding to the general formula

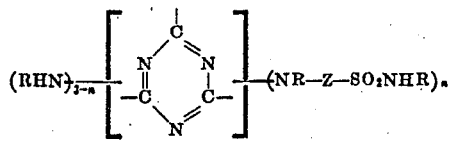

where $n$ represents an integer and is at least 1 and not more than 3, Z represents an aryl nucleus, and R represents a member of the class consisting of hydrogen and monovalent hydrocarbon and halo-hydrocarbon radicals.

13. A composition as in claim 12 wherein the urea component is the compound corresponding to the formula $NH_2CONH_2$ and the aldehyde is formaldehyde.

14. A heat-curable resinous composition comprising the heat-convertible resinous reaction product of (1) a partial condensation product of ingredients comprising formaldehyde and a sulphamylarylamino s-triazine, and (2) a curing reactant.

15. A resinous composition as in claim 14 wherein the curing reactant is a chlorinated acetamide.

16. A composition comprising the resinous product of reaction of ingredients comprising urea, formaldehyde and para-sulphamylanilino diamino s-triazine.

17. A composition containing the resinous product of reaction of ingredients comprising dimethylol urea and a sulphamylarylamino s-triazine.

18. A composition comprising the resinous product of reaction of ingredients comprising melamine, an aldehyde and a sulphamylarylamino s-triazine.

19. A resinous composition comprising the product of reaction of (1) a partial condensation product of ingredients comprising urea, formaldehyde and para-sulphamylanilino diamino s-triazine, and (2) a chlorinated acetamide.

20. The method of preparing new condensation products which comprises effecting reaction between ingredients comprising an aldehyde and a compound corresponding to the general formula

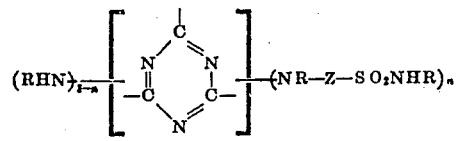

where $n$ represents an integer and is at least 1 and not more than 3, Z represents an aryl nucleus, and R represents a member of the class consisting of hydrogen and monovalent hydrocarbon and halo-hydrocarbon radicals.

GAETANO F. D'ALELIO.

CERTIFICATE OF CORRECTION.

Patent No. 2,312,697. March 2, 1943.

GAETANO F. D'ALELIO.

It is hereby certified that error appears in the printed specification of the above numbered patent requiring correction as follows: Page 1, first column, line 56-57, for "ortho-meta-and paratoluenes" read --ortho-, meta- and para-toluenes--; second column, line 11, for "(sulphamylamino)" read --(sulphamylarylamino)--; line 60, for "2,4,6-tri-para-sulphamylanilino)" read --2,4,6-tri-(para-sulphamylanilino)--; page 3, second column, line 31-32, for "unfiled" read --unfilled--; page 4, first column, line 3, for "formaldehye" read --formaldehyde--; line 16, after "aminoacetamide" strike out the comma; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.